Aug. 10, 1937.　　　　　F. SCHAEFER　　　　　2,089,578
COTTER PIN
Original Filed May 22, 1935
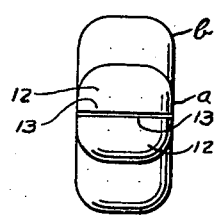
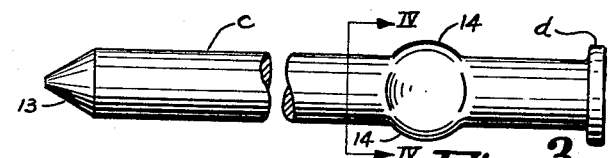
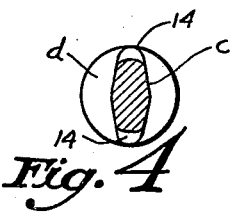
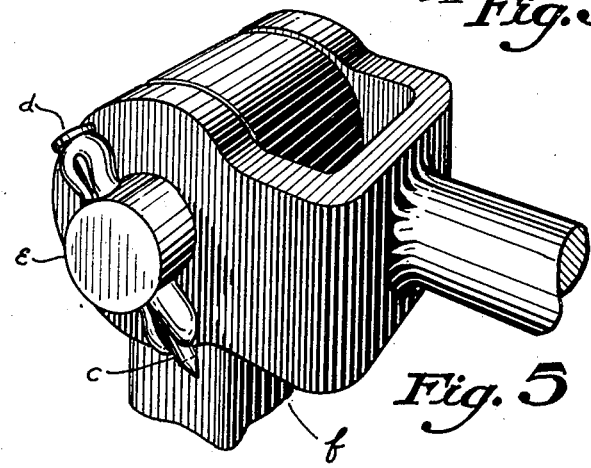
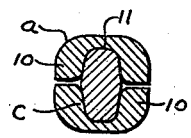
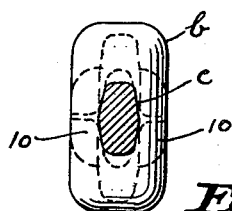
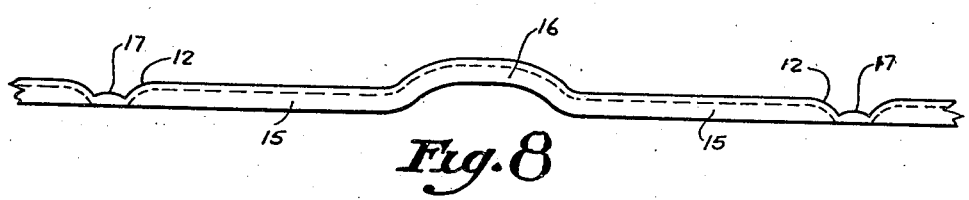
INVENTOR
Frederic Schaefer
By Charles G. Cape,
his atty.

Patented Aug. 10, 1937

2,089,578

UNITED STATES PATENT OFFICE 2,089,578

COTTER PIN

Frederic Schaefer, Pittsburgh, Pa.

Application May 22, 1935, Serial No. 22,740
Renewed January 8, 1937

6 Claims. (Cl. 85—8.5)

My invention pertains to split cotter pins such as are passed through the ends of pivot pins and the like to prevent accidental displacement of the latter with respect to the links or other members in connection with which they are used, the ends of the legs of the cotter pins being spread apart so as to retain the cotter pin in place. It relates especially to split cotter pins of the character in which an inner or spreading member is employed in such manner that a blow on the member has the effect of spreading the legs of the pin.

In some of the uses of split cotter pins (hereinafter termed cotters) the qualities of resistance to wear and of strength with minimum weight are of extra special importance. A notable example occurs in the case of railroad brake equipment, where that the cotters have these qualities in a high degree is essential. On the other hand, cotters employing interior spreading members, as heretofore proposed, have presented the inherent difficulty of being both weak and subject to rapid wear; so that certain peculiar advantages possible of attainment with such cotters have not been available in many important fields, such as that of railroad brake equipment. Accordingly it is one of the important objects of my invention to provide a cotter, of the type employing an interior spreading member, which will be light and yet possess a high degree of strength and which can be subjected to prolonged wear without its strength decreasing below the safety point. A further object is to provide a cotter of this character which will be exceptionally economical to produce, as well as very easy to insert and spread and to remove. Other objects of the invention and advantages secured thereby will appear from the specification and claims to follow.

By way of example, I have shown in the accompanying drawing, and described in the following specification, one form of cotter in which my invention may be embodied. However, it may be embodied in other forms, and changes may be made in the particular form described and shown, without exceeding the scope of the invention, as defined in the appended claims.

In the drawing:

Fig. 1 is a side elevation of the complete cotter, in its unused condition;

Fig. 2 is an end view of the same, as seen from the line II—II of Fig. 1;

Fig. 3 shows the spreading member;

Fig. 4 is a section taken on the line IV—IV of Fig. 3;

Fig. 5 shows the cotter in use;

Fig. 6 is an enlarged section taken on VI—VI of Fig. 1;

Fig. 7 is an enlarged section taken on the line VII—VII of Fig. 1; and

Fig. 8 is a side view showing the cotter at an intermediate stage of its production.

The cotter of my invention, designated $a$ in Fig. 1 of the drawing, includes a pair of closely adjacent legs of trough shape in cross-section, such legs being free at one end of the cotter and connected by a loop $b$ at the other end. The cotter is thus hollow throughout its length. Within it there is placed a spreading member $c$ (Fig. 3) which, before the cotter is used, extends a material distance beyond the loop $b$ with the end of the spreading member engaging against the ends of the hollow legs of the cotter. Thus when the cotter is placed in position, and a hammer blow struck upon the head $d$ of the spreading member, the forward end of the latter is forced between the legs of the cotter, and such legs are bent apart. The condition of the cotter, with the legs thus spread, is indicated in Fig. 5, where the cotter is shown as applied for the purpose of retaining a brake pin $e$ in position with respect to a brake link $f$.

The legs of the cotter are rectangular (in the instance shown in the drawing, square) in cross-section (Figs. 2 and 6), which at once gives the advantage of a relatively wide flat surface for engagement with the brake link or the like, whereby the wear is distributed over a wide area. In addition, the channel shape of the legs is such that the walls 10 of the channel are relatively thick while the base 11 of the channel is relatively thin. In use, the cotter is applied in such position (as shown in Fig. 6) that the split between its legs is at right angles to the surface which the cotter is to engage. Thus the thick walls 10 will provide a large quantity of metal,—many times greater than has been available with prior constructions,—which must be worn away before a danger point can be approached. Noting that the bases of the channels of the cotter legs are subjected to but little strain and thus may safely be made relatively thin, it will be observed that the increase of wearing properties afforded by the thickened walls of the channels is obtained without any sacrifice in respect to the desirable lightness of the cotter. The channels of the legs are formed with end walls 12 for engagement by the end 13 of the spreading member, such end being preferably substantially conical, so as more effectively to perform its wedging function.

The spreading member c is oval in cross-section and of such dimension along its major axis as substantially to engage the bases 11 of the channels of the legs of the cotter. The spreading member, in extending beyond the loop b of the cotter, passes through a hole in such loop; and it will be observed from Figs. 7 that the oval shape of the spreading member permits the walls 10 at each side of the hole to be wider than they could be if a round spreading member of equal cross-sectional area were employed. Therefore, given a required cross-sectional area of the spreading member, the oval shape has an effective result in lessening the weakening of the loop because of the hole necessary for the passage of the spreading member through the loop.

The spreading member is formed with humps 14 which prevent its accidental removal from the cotter,—for instance, during shipping,—and also prevent the spreading member from being driven entirely out of the cotter when a blow is struck on the point end of the combined cotter and spreading member, for the purpose of removing the cotter. These humps may be produced by means of a punch, operating through the hole provided by the eye b of the cotter, applied after the spreading member has been inserted in the cotter. The advantage of thus retaining the spreading member against removal from the cotter is obtained with great economy of manufacture, since the spreading member may be little more than a large nail, flattened, in the instance now being described, to produce an oval form.

The cotter itself, according to means I have evolved, can be produced very economically. A long metallic strip is passed between a pair of rolls which form the strip into a number of connected sections. Each of these sections comprises trough-shaped portions 15 which are to constitute the legs of the cotter and which have the closed ends 12, and a central portion 16 which is to constitute the loop b of the cotter. Subsequently, the strip is passed through a punching machine which punches the oval holes in the portions 16 and also punches out the small portions 17 between the sections. The individual sections thus produced are then bent to bring the legs together and form the cotter.

Because of its rectangular cross-section, and, in addition, of the thickened walls of the trough-shaped legs and the oval shape of the spreading member, the cotter described above, while no bigger or heavier than the cotters ordinarily employed, is entirely satisfactory as to strength and, at the same time, has exceptional wearing qualities. These results are achieved while still leaving it possible to combine with the cotter a spreading member which allows the cotter to be applied and spread by a simple hammer blow at the loop end, and removed by a similar hammer blow at the point end. These advantages have been secured with an economy of construction which allows the cotter to be sold at a price not greatly in excess of the plain cotter heretofore employed where strength and resistance to wear are of special importance.

Having thus fully described my said invention, what I claim as new, and desire to secure by Letters Patent, is:

1. The combination with a cotter having trough-shaped legs disposed adjacent each other, said legs being formed with substantially flat faces for engagement by the member to be secured by the cotter, and the trough-shaped legs being of a cross-section providing increased thickness of material adjacent said faces, of a spreading member disposed in the cavity of said cotter.

2. The combination with a cotter having trough-shaped legs disposed adjacent each other, the troughs being shaped in cross-section to have side walls which are thicker than the bases, of a spreading member disposed in the cavity of said cotter and engaging the bases of the troughs.

3. The combination with a cotter having legs of trough shape in cross-section disposed with the edges of the troughs adjacent each other, the troughs being flattened at the outer sides and having the side walls of greater thickness than the bases, of a spreading member disposed in the cavity of said cotter in substantial engagement with the bases of the troughs.

4. The combination with a cotter having legs of trough shape in cross-section disposed with the edges of the troughs adjacent each other, the troughs being flattened at the outer sides and having the side walls of greater thickness than the bases to produce substantially semi-oval cavities, of a spreading member of substantially oval cross-section disposed in the cavity of said cotter.

5. The combination with a cotter having legs of trough shape in cross-section disposed with the edges of the troughs adjacent each other and connected by a loop, the troughs being flattened at the outer sides and having the side walls of greater thickness than the bases to produce substantially semi-oval cavities, of a spreading member of uniform substantially oval cross-section disposed in the cavity of said cotter and passing through said loop.

6. The combination of a cotter having legs of substantially trough shape in cross-section connected by a loop, each trough having a wall substantially closing the end thereof remote from the loop, and the loop having a hole formed substantially centrally therethrough, of a spreading member disposed in the cavity of said cotter and passing through the hole of said loop, said member being of substantially uniform cross-section throughout its length corresponding in shape with said cavity, said member being formed with projections disposed in the region of said loop and of a diameter greater than that of said hole, whereby withdrawal of said member from said cotter is prevented.

FREDERIC SCHAEFER.